United States Patent
Reiderman et al.

(10) Patent No.: US 9,880,307 B2
(45) Date of Patent: Jan. 30, 2018

(54) INDUCTION LOGGING SENSOR

(71) Applicant: Baker Hughes Incorporated, Houston, TX (US)

(72) Inventors: Arcady Reiderman, Katy, TX (US); Stanislav W. Forgang, Houston, TX (US); Steven A. Morris, Spring, TX (US); Jonathan F. Hook, Houston, TX (US); Yi Liu, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 93 days.

(21) Appl. No.: 14/522,411

(22) Filed: Oct. 23, 2014

(65) Prior Publication Data

US 2015/0115965 A1    Apr. 30, 2015

Related U.S. Application Data

(60) Provisional application No. 61/895,095, filed on Oct. 24, 2013.

(51) Int. Cl.
*G01V 3/10* (2006.01)
*G01V 3/20* (2006.01)
(Continued)

(52) U.S. Cl.
CPC .......... *G01V 3/10* (2013.01); *E21B 47/02216* (2013.01); *E21B 47/0905* (2013.01);
(Continued)

(58) Field of Classification Search
CPC ... G01V 3/10; G01V 3/20; G01V 3/30; G01V 3/104; E21B 47/0905; E21B 47/02216
(Continued)

(56) References Cited

U.S. PATENT DOCUMENTS

| 4,812,812 A |   | 3/1989 | Flowerdew et al. |
|---|---|---|---|
| 6,100,696 A | * | 8/2000 | Sinclair ............ G01V 3/28 324/338 |

(Continued)

FOREIGN PATENT DOCUMENTS

JP    2000098012 A    4/2000

OTHER PUBLICATIONS

G. Dehmel, "Magnetic Field Sensors: Induction Coil (Search Coil) Sensors," chapter 6 of Magnetic Sensors, eds. R. Boll and K.J. Overshott, 1989, pp. 205-254 (vol. 5 of Sensors: A Comprehensive Survey, eds. W. Gopel, J. Hesse, and J.N. Zemel), VCH Publishers Inc., New York, NY, USA and Weinheim, Federal Republic of Germany, 1989.

(Continued)

*Primary Examiner* — Son Le
*Assistant Examiner* — Akm Zakaria
(74) *Attorney, Agent, or Firm* — Hirsch & Westheimer, PC

(57) ABSTRACT

Apparatuses and methods are provided herein that may improve sensitivity to transient signals. For example, an electromagnetic sensor for downhole measurements that includes a plurality of sectors (e.g., four quadrants) is provided herein. Each quadrant may include a magnetic core formed of a material with a high initial magnetic permeability to improve sensitivity to transient signals. A sensor for continuous wave induction tools is also provided, and may include a magnetic core formed of a material with a high initial magnetic permeability. Forming each sector magnetic core of a material with a high mechanical reliability may allow the magnetic core of the corresponding sensor to be pliable and flexible and not brittle and prone to breaking. Furthermore, the corresponding sensor may have (Continued)

enhanced sensitivity, greater stability of sensitivity relative to temperature changes, and high mechanical reliability.

18 Claims, 5 Drawing Sheets

(51) Int. Cl.
 *G01V 3/30* (2006.01)
 *E21B 47/022* (2012.01)
 *E21B 47/09* (2012.01)
(52) U.S. Cl.
 CPC ............... *G01V 3/104* (2013.01); *G01V 3/20* (2013.01); *G01V 3/30* (2013.01)
(58) Field of Classification Search
 USPC .......................................................... 324/339
 See application file for complete search history.

(56) References Cited

U.S. PATENT DOCUMENTS

| | | |
|---|---|---|
| 6,452,388 B1 | 9/2002 | Reiderman et al. |
| 7,038,457 B2 | 5/2006 | Chen et al. |
| 7,235,970 B2 | 6/2007 | Kruspe et al. |
| 7,286,091 B2 | 10/2007 | Chen et al. |
| 7,420,373 B2 | 9/2008 | Reiderman et al. |
| 7,423,426 B2 | 9/2008 | Reiderman |
| 7,663,363 B2 | 2/2010 | Reiderman |
| 8,035,392 B2 | 10/2011 | Ltskovich et al. |
| 8,239,172 B2 | 8/2012 | Reiderman et al. |
| 8,362,781 B2 | 1/2013 | Reiderman |
| 8,378,908 B2 | 2/2013 | Wisler et al. |
| 8,432,167 B2 | 4/2013 | Reiderman |
| 8,471,562 B2 | 6/2013 | Knizhnik |
| 2004/0196047 A1 | 10/2004 | Fanini et al. |
| 2005/0189945 A1* | 9/2005 | Reiderman ............... G01V 3/28 324/333 |
| 2006/0202699 A1* | 9/2006 | Reiderman ............... G01V 3/28 324/339 |
| 2006/0255799 A1 | 11/2006 | Reiderman |
| 2010/0134112 A1 | 6/2010 | Zhang et al. |
| 2010/0271030 A1 | 10/2010 | Reiderman et al. |
| 2011/0304338 A1* | 12/2011 | Nagasaki ............... G01V 3/104 324/345 |
| 2012/0065937 A1* | 3/2012 | de Graff ............... G01D 9/005 702/187 |
| 2012/0086619 A1* | 4/2012 | Nakamura ............. G04G 21/04 343/788 |
| 2015/0027232 A1* | 1/2015 | Matsumoto ............. G01F 1/582 73/861.11 |

OTHER PUBLICATIONS

PCT International Search Report and Written Opinion issued in PCT application No. PCT/US2014/062192, dated Feb. 4, 2015, 16 Pages.

* cited by examiner

INDUCTION LOGGING SENSOR

CROSS-REFERENCE TO RELATED APPLICATIONS

This application claims priority under 35 USC §119(e)(1) of Provisional Application No. 61/895,095, filed Oct. 24, 2013, incorporated herein by reference.

TECHNICAL FIELD OF THE INVENTION

The present disclosure relates generally to systems, methods, and apparatuses for electromagnetic well logging instruments that use magnetic field sensors and magnetic field transmitters.

BACKGROUND

Electromagnetic well logging, and more specifically, electromagnetic induction well logging, may be used to determine electrical properties of earth formations. Reservoir rocks holding hydrocarbons are typically much less electrically conductive than non-reservoir rocks holding interstitial water, and therefore, measuring formation conductivity or resistivity may provide a useful guide to the presence of oil, gas, or water. Such measurements can also be used to find locations of bed boundaries between rock formations. Knowledge of the locations of bed boundaries relative to the drilling trajectory while drilling may be used to perform geosteering to adjust a borehole trajectory.

Transient electromagnetic induction well logging may use a reversible magnetic dipole to generate transient currents in earth formations in order to study the electrical properties of the earth formations. For example, a subsurface logging instrument may consist of a magnetic transmitter and an induction magnetic sensor receiver. The transmitter may act as a magnetic dipole and be a switchable magnet source or an induction coil driven by a switched electric current. This instrument may be lowered and utilized for electromagnetic induction well logging. When the magnetic dipole is rapidly switched on or off, transient currents are induced in the surrounding rock formations. These currents diffuse outward and experience changes as the currents intersect variations in rock resistivity. As the currents diffuse outward, they in turn induce magnetic fields that may be detected in the receiver sensor. Processing of the detected signals may produce a profile of the formation.

Existing induction sensors typically use ferrites as part of their magnetic core. Ferrites are a ceramic compound consisting of a mixed oxide of iron and one or more other materials. Ferrites have ferromagnetic properties. Induction sensors use core materials that are "soft" magnetic materials, with low coercivity. For a low coercivity material, the magnetic flux is induced at very low magnetic field strength and the material retains very little magnetization. In contrast, hard magnetic materials require a high strength magnetic field to alter their magnetic flux and hard magnetic materials retain magnetization. Hard magnetic materials are used for permanent magnets.

An increase in the receiver sensor's sensitivity to transient signals may lead to an increase in accuracy. There remains a need for better techniques to implement electromagnetic induction well logging, and more particularly, a need to increase the sensor's sensitivity.

SUMMARY

Apparatuses and methods are provided herein that may improve sensitivity of sensors used to detect transient signals. According to a first aspect of the invention, there is provided an apparatus including an electromagnetic sensor, the electromagnetic sensor including a plurality of sectors. Each of the sectors includes a magnetic core formed of a low electromagnetic loss material, the material also having a high initial magnetic permeability as compared to a ferrite material.

According to a second aspect of the invention, there is provided a method of manufacturing an electromagnetic sensor, the electromagnetic sensor including a magnetic core in a plurality of sectors. The magnetic core contains at least one layer of a material that has a high initial magnetic permeability as compared to a ferrite material.

According to a third aspect of the invention, there is provided a method of providing a logging tool having an electromagnetic sensor configured with a plurality of sectors into a wellbore to perform a transient induction measurement using the logging tool. The electromagnetic sensor of this method includes a magnetic core formed of a material having a high initial magnetic permeability as compared to a ferrite material in at least some of the plurality of sectors.

BRIEF DESCRIPTION OF THE DRAWINGS

The following figures form part of the present specification and are included to further demonstrate certain aspects of the present claimed subject matter, and should not be used to limit or define the present claimed subject matter. The present claimed subject matter may be better understood by reference to one or more of these drawings in combination with the description of embodiments presented herein. Consequently, a more complete understanding of the present embodiments and further features and advantages thereof may be acquired by referring to the following description taken in conjunction with the accompanying drawings, in which like reference numerals may identify like elements, wherein:

NOTATION AND NOMENCLATURE

Figure 1:
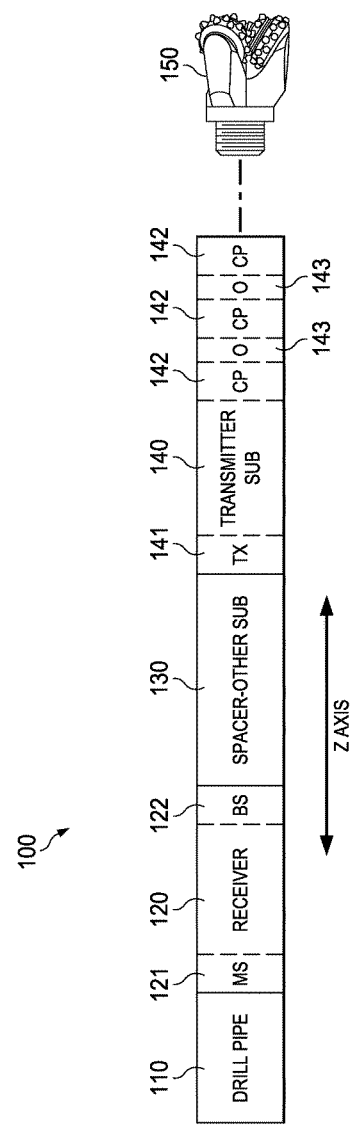
FIG. 1 is a schematic illustration of a logging tool for performing downhole measurements, disposed in association with a drill pipe and a drill bit, in accordance with some embodiments.

Certain terms are used throughout the following description and claims to refer to particular system components and configurations. As one skilled in the art will appreciate, the same component may be referred to by different names. This document does not intend to distinguish between components that differ in name but not function. In the following discussion and in the claims, the terms "including" (and the like) and "comprising" (and the like) are used in an open-ended fashion, and thus should be interpreted to mean "including, but not limited to . . . " Also, the term "couple," "coupled," or "couples" is intended to mean either an indirect or direct electrical or mechanical connection. Thus, if a first device couples to a second device, that connection may be through a direct electrical or mechanical connection, or through an indirect electrical or mechanical connection via other devices and connections, or through inductive or capacitive coupling.

Furthermore, as used in this disclosure, when reference is made to the magnetic permeability of a material under baseline conditions, the terms "initial permeability" or "initial magnetic permeability" (referred to by the symbol $\mu_i$) will be used interchangeably. Initial permeability refers to a certain physical property of a substance (i.e., material) without relation to a particular geometry or other variable factors with regard to a sensor manufactured from the material. Magnetic permeability of a material, as well as initial magnetic permeability of a material, refers to a quantity measuring influence of a substance on magnetic flux in a region it occupies. Magnetic permeability of a material may change from its initial permeability (e.g., baseline value of magnetic permeability) based on the temperature of the material or other factors. Magnetic permeability of different materials under controlled external conditions is provided in American Society for Testing and Materials (ASTM) standard ASTM A772 entitled, "Standard Test Method for ac Magnetic Permeability of Materials Using Sinusoidal Current." When comparing initial permeability of different materials, external variables (e.g., temperature, geometry, magnetic excitation, etc.) are kept consistent. As explained in more detail below, for a given shape of sensor a material with a higher initial permeability has more influence on magnetic flux than a comparable amount of a material with a lower initial permeability. The terminology "sensing of transient signals" may include detecting transient signals, identifying transient signals, responding to transient signals, or the like. The terminology "at least one of a high initial magnetic permeability, a high temperature stability, or a high mechanical reliability" or the like may include all three of these properties or fewer than all three of these properties. The term "high initial magnetic permeability" refers to a material having a higher initial magnetic permeability than a ferrite material. The term "high temperature stability" refers to a sensor maintaining a relatively narrow range of sensitivity to measurement even when a material forming the core of the sensor undergoes changes in its relative permeability due to changes in temperature. The term "high mechanical reliability" refers to a core of a sensor manufactured to maintain its operational effectiveness even when subjected to harsh (sometimes extreme) operational environments.

DETAILED DESCRIPTION

The foregoing description of the figures is provided for the convenience of the reader. It should be understood, however, that the embodiments are not limited to the precise arrangements and configurations shown in the figures. Also, the figures are not necessarily drawn to scale, and certain features may be shown exaggerated in scale or in generalized or schematic form, in the interest of clarity and conciseness. The same or similar parts may be marked with the same or similar reference numerals.

While various embodiments are described herein, it should be appreciated that the present disclosure encompasses many inventive concepts that may be embodied in a wide variety of contexts. The following detailed description of exemplary embodiments, read in conjunction with the accompanying drawings, is merely illustrative and is not to be taken as limiting the scope of the invention, as it would be impossible or impractical to include all of the possible embodiments and contexts of the invention in this disclosure. Upon reading this disclosure, many alternative embodiments of the present invention will be apparent to persons of ordinary skill in the art. The scope of the invention is defined by the appended claims and equivalents thereof.

Illustrative embodiments of the invention are described below. In the interest of clarity, not all features of an actual implementation are necessarily described in this specification. In the development of any such actual embodiment, numerous implementation-specific decisions may need to be made to achieve the design-specific goals, which may vary from one implementation to another. It will be appreciated that such a development effort, while possibly complex and time-consuming, would nevertheless be a routine undertaking for persons of ordinary skill in the art having the benefit of this disclosure.

A core of a sensor formed of ferrite, for example, may be less sensitive than a core of another material or materials. Moreover, the structural integrity of such a sensor may be jeopardized by a ferrite core that is brittle and prone to breaking, and the sensor may not function properly. However, provided herein is a sensor with a magnetic core formed of a material having a high initial magnetic permeability, and the magnetic core of this sensor may not be as brittle and prone to breaking (e.g., as compared to a sensor with a core formed of ferrite). Furthermore, the sensor including a magnetic core formed of a material having a high initial magnetic permeability may have enhanced sensitivity and greater stability of sensitivity (e.g., as compared to a sensor with a core formed of ferrite). As an example, a magnetic core formed of amorphous ribbon, as described herein, may not be brittle and may provide enhanced sensitivity and greater stability of sensitivity. By using an amorphous ribbon core (or cores), instead of a ferrite core (or cores), a sensor may be able to better tolerate vibrations and/or shock in the drilling environment, as well as provide more accurate data due to the improved sensitivity. A sensor having multiple cores may be used to collect a plurality of measurements that may be combined and/or used for further calculations. For example, each core of a sensor may be configured to act as an antenna for the overall sensor. In one embodiment, a sensor having four quadrant sectors, each with a core, would provide four antennas and may be advantageous over a single antenna sensor. As mentioned above, a core with a high magnetic permeability amplifies available magnetic flux in a region more so than does a geometrically identical core of a lower magnetic permeability, thus providing for increased sensor sensitivity to magnetic flux measurements (See FIG. 4).

Figure 3:
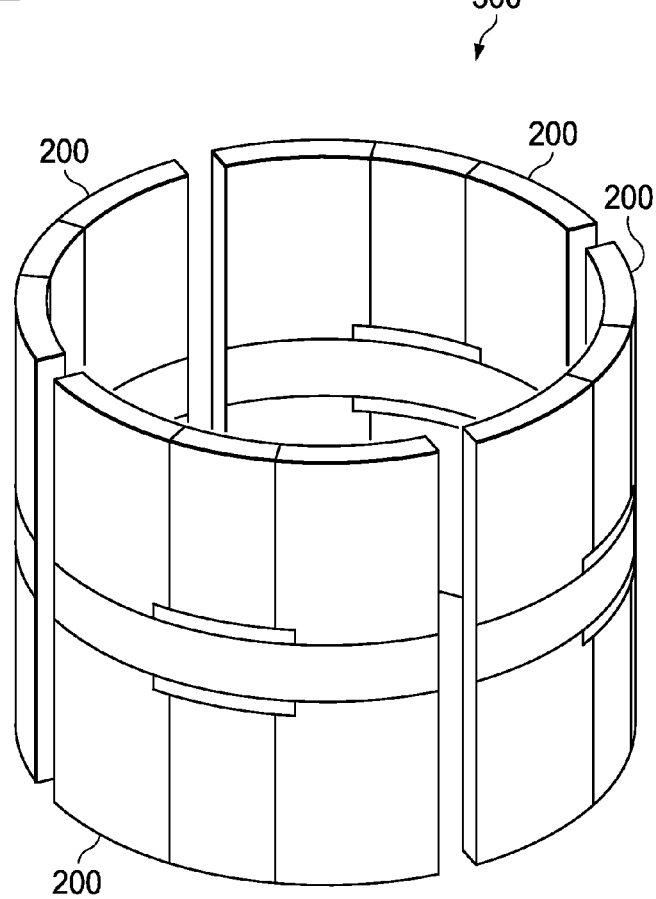
FIG. 3 illustrates a possible configuration of four sectors (as shown in FIG. 2) forming four quadrants of a circle, in accordance with some embodiments.

According to some embodiments, an electromagnetic sensor may be configured in a shape approximating a cylinder without top and bottom, e.g., without the two planar ends that are perpendicular to the cylindrical axis (See FIG. 3). The sensor having this shape may be divided into sectors, i.e., circumferentially extended portions, with a separation between each two adjacent sectors, a line of such separation extending parallel to the cylindrical axis. For simplicity, this disclosure will refer primarily to embodiments in which the configuration of the sensor includes four sectors (e.g., quadrants) of the above-described cylindrical shape. For convenience, the sectors of the sensor may be also referred to as sectors of a circle. To be sure, one of ordinary skill in the art, given the benefit of this disclosure, will realize that sensor sectors may also be semicircles (halves of a circle), sextants (sixths of a circle), octants (eighths of a circle), etc. Further, it is possible for the sensor sectors to be not equal (e.g., not of equal circumferential extent) but rather to be of varying complementary sizes that together form a circle (or portion thereof). For example, there could be two sectors covering 120 degrees of circumference each and two sectors covering 60 degrees of circumference each, for a total four sectors covering 360 degrees, that is, an entire circle. In another example, there could be a plurality of sectors that do not cover an entire circle and may include gaps between adjacent sectors.

FIG. 1 illustrates logging tool 100 for use in downhole measurements, such as downhole transient induction measurements. Logging tool 100 may be utilized in the context of logging while drilling (LWD) and similar activities (e.g., measuring or measurements while drilling (MWD)). Logging tool 100 may include a receiver subassembly 120 and a transmitter subassembly 140. Logging tool 100 may also include a spacer, another LWD subassembly, or other subassembly located between receiver subassembly 120 and transmitter subassembly 140. This spacer or other subassembly is generally illustrated as element 130 and, in this example, provides a defined distance between transmitter 140 and receiver 120. Logging tool 100 may be mounted to or coupled to a drill pipe 110 and a drill bit 150. Drill bit 150 may be mounted at some distance further downhole from logging tool 100 as illustrated by the ellipses between transmitter 140 and drill bit 150. In some embodiments, logging tool 100 may be associated with a wireline (not shown). In FIG. 1, logging tool 100 includes elements 120, 130 and 140. Drill pipe 110 and drill bit 150 are not specifically part of logging tool 100 but, in operation, they are coupled to logging tool 100. In contrast, elements 120, 130, and 140 are considered to form a portion of drill pipe 110 and, in addition to their logging functions, perform as an integral part of drill pipe 110 (or elements 120, 130, and 140 may be thought of as encased in a pipe section performing the function of drill pipe 110).

Receiver subassembly 120 may include at least one electromagnetic sensor, such as electromagnetic sensor 121. Electromagnetic sensor 121 may be at least one of an induction logging sensor, a single axis sensor (e.g., a single axis induction logging sensor) or a multi-axial sensor (e.g., a multi-axial induction logging sensor). Those of ordinary skill in the art will appreciate that the principles of the present disclosure apply to single axis sensors in a manner similar to multi-axial sensors that are discussed herein.

In particular, electromagnetic sensor 121 may be a multi-axial transient induction sensor for downhole transient induction measurements. More specifically, electromagnetic sensor 121 may be a tri-axial transient induction (e.g., a broadband induction type) sensor for sensing of transient signals. Electromagnetic sensor 121 may respond to transient signals along three mutually orthogonal collocated axes, referred to as the x-axis, y-axis, and z-axis. The z-axis may change in use (e.g., as the orientation of the tool changes) but remains constant with an axis running the length of logging tool 100 as illustrated in FIG. 1.

Figure 2:
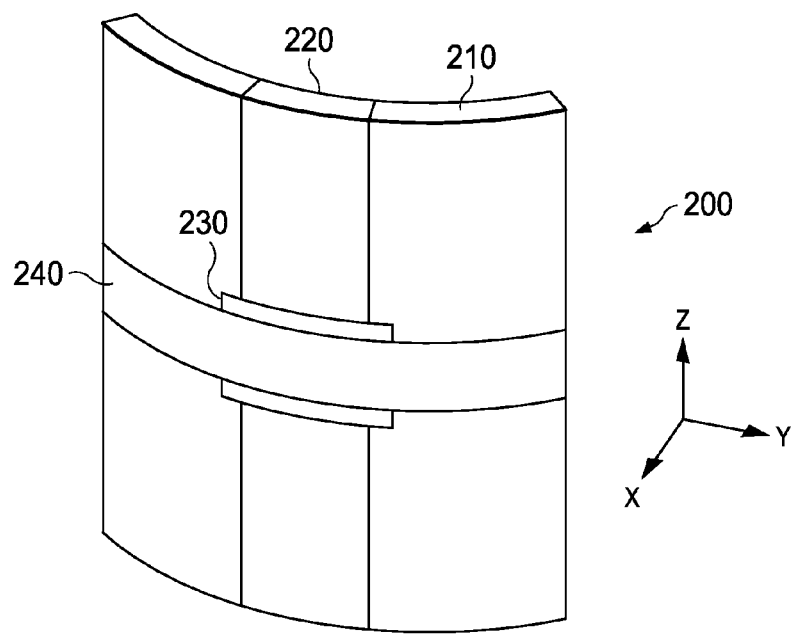
FIG. 2 illustrates a view of a sector of an electromagnetic sensor having a core formed from a material having a high initial magnetic permeability, in accordance with some embodiments.

With reference to FIGS. 2-3, electromagnetic sensor 121 (shown in FIG. 1) may include multiple portions (sectors 200) extending circumferentially, and optionally spaced apart from one another circumferentially, around drill pipe 110 (shown in FIG. 1). It is noted that the extent of the separation between these portions (sectors 200) may vary from very little spacing to substantial spacing. The separation is not necessarily drawn to scale in FIG. 3. As indicated, electromagnetic sensor 121 may be a tri-axial transient induction sensor that uses broadband induction. For example, electromagnetic sensor 121 may operate over a very wide bandwidth from about 1 Hz to above 200 kHz, including responding to a wideband pulse and operating simultaneously over a wide frequency band.

With continued reference to FIGS. 2-3, electromagnetic sensor 121 may include a plurality of sectors 200, e.g., four sectors 200. Each of the four sectors 200 may also be referred to as an antenna or a quadrant antenna. The four sectors 200 together may form a substantially cylindrical shape, as illustrated in diagram 300 of FIG. 3, but those of ordinary skill in the art will appreciate that other shapes and variations are possible (e.g., more or less than four sectors). In this example embodiment, each sector 200 is positioned across from a sector on the opposite side of the substantially cylindrical shape which may be referred to as an opposing sector. In the example quadrant sector embodiment, there are exactly two pairs of opposing sectors.

As shown in FIG. 2, each of the four sectors 200 of electromagnetic sensor 121 may include a magnetic core 210 and a plurality of coils or windings (e.g., 220 and 240). In the illustrated embodiment, coils 220 and 240 are separated from each other by shield 230. Magnetic core 210, in this example, is formed of a material having a high initial magnetic permeability. Magnetic core 210 is also manufactured such that it has a high mechanical reliability. Electromagnetic sensor 121 of this embodiment also maintains a high temperature stability, based in part on the properties of the material forming magnetic core 210. As used in this disclosure, a sector (e.g., 200) of a sensor (e.g., 121) may be distinguished from a core (e.g., 210) of a sector (e.g., 200) because each sector (e.g., 200) of a sensor (e.g., 121) contains a core (e.g., 210) that has been wrapped with one or more coils (e.g., 220, 240) with each coil possibly shielded from each other (e.g., by shield 230) to form the sector (e.g., 200). A core manufactured to have a high initial magnetic permeability facilitates improved sensor sensitivity as discussed herein. High temperature stability refers to a property of the sensor such that the changes in the permeability of the material forming the core does not contribute to significant changes in sensor sensitivity at different operating temperatures as may be encountered in downhole operation. Aspects of changes in magnetic permeability of a material (i.e., variations from its initial permeability) with respect to changes in temperature are discussed in more detail below. High mechanical reliability refers to a property of the manufactured core 210 such that it is not brittle and prone to breaking due to vibrations and other rough operating conditions. As previously noted, the terminology "at least one of a high initial permeability, high temperature stability, or high mechanical reliability" or the like may include all three of these properties or fewer than all three of these properties. In accordance with some embodiments of this disclosure, magnetic core 210 may be a thin quarter cylindrical core (e.g., quadrant) whose thickness is much smaller than its axial length and circumferential extent.

As indicated, sector 200 may include at least one coil or winding wound around a portion of magnetic core 210 for sensing of transient signals. For example, sector 200 may include a plurality of coils, such as two coils 220, 240, and the two coils 220, 240 may be wound in respective directions orthogonal to one another around portions of magnetic core 210, as shown in FIG. 2, for sensing of transient signals (e.g., along corresponding orthogonal axes). In other words, sector 200 may include a lateral (circumferential) winding or coil 240 as well as an axial winding or coil 220. Opposing lateral windings or coils (e.g., corresponding coils from an opposing sector) may be connected to each other utilizing one or more exposed lead wires (not shown). This pair of coils from opposing sectors is configured to be sensitive to transient signals in one of the lateral axes. A second set of opposing sectors (in the example quadrant embodiment) is configured to be sensitive to transient signals in the other lateral axis, resulting in two pairs of opposing sector lateral windings or coils to yield two orthogonal lateral axes (i.e., x-axis and y-axis) in electromagnetic sensor 121. All four axial windings or coils of the four sectors 200 may be connected using one or more lead wires (not shown) to be sensitive to transient signals in the axial sensor axes (i.e., z-axis). Additionally, interwound comb type shields 230 may be used to suppress capacitive interaction between the windings of each sector 200. Shield 230 may also have one or more lead wires (not shown) to connect with shields of other sectors without forming a closed loop across all four shields. Although this embodiment utilizes lateral and axial windings, other possible windings of coils around cores are also possible (e.g., such as tilted coils).

Referring more specifically to the material of magnetic core 210, a nano-magnetic material may provide for a core having two of the aforementioned properties and ultimately a sensor having the third, namely the core would have both high initial permeability and high mechanical reliability to allow for manufacture of a sensor with high temperature stability. The nano-magnetic material is deemed to have a high permeability if its permeability is higher than that of a ferrite material. For example, the relative permeability for a nano-magnetic material (e.g., a nano-magnetic ribbon material, described below) may be about 10,000 or greater, which is higher than the low to medium relative permeability of a ferrite material, which is typically in the range of 100 to 1,000. Of note, the nano-magnetic material may be anisotropic and may exhibit a wide range of permeability. For example, a particular nano-magnetic material may have a relative permeability of about 20,000 in the direction parallel to the ribbon length and a relative permeability of about 10,000 in the direction perpendicular to the ribbon length. In accordance with some embodiments, a material having a high relative permeability may be a material having a relative permeability between approximately 10,000 and approximately 20,000 inclusive.

Figure 4:
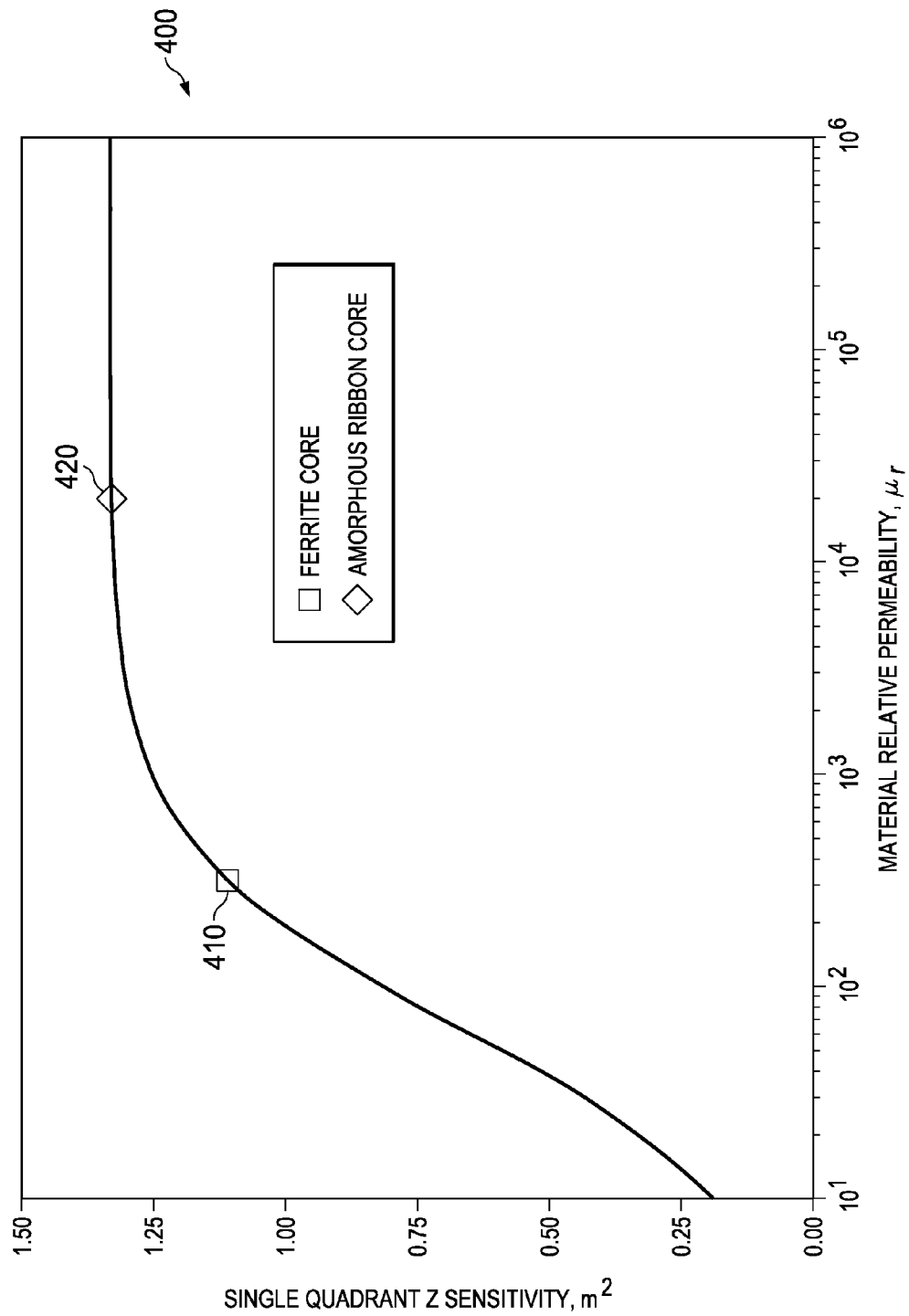
FIG. 4 illustrates a graph for a single quadrant (or antenna) of an electromagnetic sensor of the logging tool of FIG. 1, that plots single quadrant Z sensitivity as a function of material relative permeability.

In accordance with some embodiments, properties of the sensor (e.g., 121) assembled using one or more cores (e.g., 210) made from a nano-magnetic material may have a high temperature (or thermal) stability compared to a sensor assembled using cores of a ferrite material. FIG. 4 shows graph 400 illustrating the logarithmic nature of a plot of sensor sensitivity versus material relative permeability. For example, the sensitivity of a sensor having a core of the nano-magnetic material may change less than does the sensitivity of a sensor having a core of a ferrite material as the temperature changes. That is, if the change in temperature causes a change from the initial permeability such that the magnetic permeability of the core is reduced by a factor of 2, the nano-magnetic material may reduce in material relative permeability from 20,000 to 10,000 and maintain a high level of sensitivity. In contrast, if the change in temperature causes the ferrite material relative permeability to be reduced by a factor of 2 from its initial permeability, the ferrite material may reduce in relative permeability from 1000 to 500 having a more pronounced decrease in sensitivity as illustrated in graph 400 of FIG. 4.

The core (e.g., 210) manufactured from the disclosed nano-magnetic material may be deemed to have a high mechanical reliability by virtue of having any of the following properties: not as brittle as a ferrite material; flexible, easy to work with, and not as easily damaged in a drilling environment as compared to a ferrite material; not as susceptible to loss of operational characteristics due to vibrations and/or shock in the drilling environment.

In view of the above desirable properties of certain nano-magnetic materials, the material forming the magnetic core 210 of the sector 200 may be such a nano-magnetic material. In some embodiments, the material forming magnetic core 210 may be a nano-magnetic ribbon material. For example, the nano-magnetic ribbon material may be approximately thirty microns thick and up to several centimeters wide. In some embodiments, the material forming magnetic core 210 may be a nano-crystalline material (also referred to as nano-crystalline ribbon material or simply nano-crystalline ribbon). In some embodiments, the material forming magnetic core 210 may be a nano-amorphous material (also referred to as nano-amorphous ribbon material or amorphous ribbon material or simply amorphous ribbon). In some embodiments, the material forming magnetic core 210 may be a non-ferrite material. In some embodiments, the material forming magnetic core 210 may have a relative magnetic permeability between about 10,000 to about 20,000 inclusive, and a correspondingly high initial magnetic permeability.

In some embodiments, some other material or combination of other materials and disclosed materials may be utilized to form magnetic core 210. The other material may be a material that has properties of two or more of the aforementioned materials that may be complimentary to a property of a disclosed material. Accordingly, such a combination of materials may better satisfy at least the three properties of high initial permeability, high temperature stability, and high mechanical reliability to produce a magnetic core (e.g., 210) and ultimately sensor (e.g., 121) according to disclosed embodiments. For example, a nano-magnetic material may be made into a nano-magnetic ribbon material, and one type of the nano-magnetic ribbon material may be a nano-amorphous material while a second type of the nano-magnetic ribbon material may be a nano-crystalline material. Accordingly, magnetic core 210 may be formed of a material that is both a nano-magnetic ribbon material and a nano-amorphous material, etc.

An amorphous ribbon, with a relative magnetic permeability of about 20,000, is manufactured by Nanostructured & Amorphous Materials, Inc., 16840 Clay Road, Suite #113, Houston, Tex. 77084. This amorphous ribbon is one example of an amorphous ribbon that may be utilized to form magnetic core 210 of quadrant sector 200. This amorphous ribbon may have the following physical properties: a saturation induction of about 1.56 T, a Curie temperature of about 410° C., a crystallization temperature of about 535° C., a saturation magnetostriction of about 27×10$^{-6}$, a hardness Hv of about 960 kg/mm$^2$, a density of about 7.18 g/cm$^3$, and a resistivity of about 130 μΩ-cm. In addition, this amorphous ribbon may have the following properties: iron-based, a composition of about 76-80 at % Fe, 20-24 at % Si+B, a ribbon thickness of about 30±5 μm, and a ribbon width of about 5 to 50 mm.

It is worth noting that other materials, not discussed herein, may be utilized to form the core of each of the sectors 200 of electromagnetic sensor 121 consistent with the principles of the present invention. For example, any material with a high initial magnetic permeability may be utilized. As another example, any material that has at least one of high initial permeability, high temperature stability, or high mechanical reliability may be utilized. Usage of an amorphous ribbon, a nano-magnetic material more generally, a non-ferrite material or the like may improve sensitivity of electromagnetic sensor 121 to transient signals.

As discussed generally above, in electromagnetism, magnetic permeability is the measure of the ability of a material to support the formation of a magnetic field within itself. In other words, it is the degree of magnetization that a material obtains in response to an applied magnetic field. Magnetic permeability is typically represented by the Greek letter μ. The permeability constant ($\mu_0$), also known as the magnetic constant or the permeability of free space has the defined value $\mu_0 = 4\pi \times 10^{-7}$ H·m$^{-1}$. Relative permeability of a material, $\mu_r$, is the ratio of the magnetic permeability of a specific material to the permeability constant $\mu_0$. As used in this disclosure, initial magnetic permeability refers to a "baseline" magnetic permeability. For example, initial magnetic permeability refers to the magnetic permeability at manufacturing time under manufacturing conditions prior to changes to magnetic permeability caused by operational conditions. Similarly, initial magnetic permeability refers to magnetic permeability after manufacture when a tool is idle (e.g., not subject to changes in operational environment). As understood by those of ordinary skill in the art and explained throughout this disclosure, a given material's magnetic permeability may be affected by changes in temperature, orientation, humidity, etc. Initial permeability of a material may be represented as $\mu_i = \mu_0 \times \mu_r$ (note: magnetic permeability μ and $\mu_i$ are equal if all other factors are kept constant).

Those of ordinary skill in the art will appreciate that the sensitivity of an electromagnetic sensor to a magnetic field may be proportional to the sensitivity of the core, which in turn is a function of effective magnetic permeability $\mu_{eff}$ of the core and the geometry of the core. As mentioned above, initial permeability refers to a baseline value; relative magnetic permeability of material in a core in a sensor of a downhole tool may vary in operation because of changes in temperature, etc. These relationships may be expressed as follows:

$$\text{sensitivity} = \mu_{eff} \times \text{area} \quad \text{Equation No. 1}$$

$$\mu_{eff} = f(\mu_r, \text{geometry}) \quad \text{Equation No. 2}$$

where $\mu_{eff}$ is effective permeability of the core (sometimes referred to as a permeability of the shape) and is affected by temperature, and area is the cross sectional area of the core, normal to the direction of the magnetic field being sensed. Moreover, for cores made of ferrite materials, the effective permeability has a strong dependence on temperature. Because of this, changes away from initial permeability caused by temperature dependence may cause significant changes in the sensitivity of the core relative to its sensitivity at time of manufacture. Accordingly, operational temperature changes may result in significant changes in sensor sensitivity. These significant changes in sensitivity of the receiver at operational time may further cause challenges in receiver calibration.

A non-ferrite ribbon material (e.g., a nano-magnetic ribbon material) may have initial permeability approximately two orders of magnitude greater than a ferrite material. Because of this, the sensitivity of a core formed from such a non-ferrite core is almost completely dependent on the geometry of the core. Hence, for non-ferrite ribbon material, the sensor sensitivity will have little dependence on temperature. A sensor whose sensitivity changes only little in operation due to downhole temperature changes may accordingly result in easier receiver calibration.

FIG. 4 illustrates a graph 400 for a single sector (or antenna) of an electromagnetic sensor that plots single sector (e.g., a quadrant sector as shown in FIG. 2) Z sensitivity in meters squared (m$^2$) as a function of material relative permeability. This graph was generated using finite element analysis simulation of the sensitivity of the quadrant sector. Typically, for downhole logging use, a core of a ferrite material may have a relative permeability of 300 and produces a single quadrant Z sensitivity of 1.110 m$^2$, as illustrated at 410 in FIG. 4. For this ferrite material, as temperature changes, the relative permeability may increase to close to 500, and, as predicted by graph 400 of FIG. 4, the single quadrant Z sensitivity would increase to about 1.2 m$^2$, which is an increase of about 8%. This change in sensitivity due to temperature change may need to be measured to calibrate a magnitude of a formation signal.

In contrast, a core of a non-ferrite ribbon material, which may have a higher relative permeability, may have a higher sensitivity according to graph 400 of FIG. 4. For example, a core of the aforementioned amorphous ribbon manufactured by Nanostructured & Amorphous Materials, Inc. may have a minimum relative permeability of 20,000. Moreover, non-ferrite materials may have a high Curie temperature and therefore a more stable magnetic permeability with respect to temperature. As illustrated in graph 400 of FIG. 4, a material with a relative permeability of 20,000 may produce a single quadrant Z sensitivity of 1.332 m$^2$, which is an increase in sensitivity of about 20% over that produced using the core of the ferrite material having relative permeability of 300. This increased sensitivity is illustrated at 420 of graph 400. Even assuming a drastic change in permeability by halving the permeability of this amorphous ribbon to 10,000, this assumption reduces sensitivity by only about 0.5%, making the sensitivity much more stable with respect to changes from initial permeability than a ferrite material. It is understood that in practice it is likely that the magnetic permeability of this amorphous ribbon will change no more than about 10% from its initial permeability (over a temperature range of 25° C. to 150° C.), so that the sensitivity of a sensor employing a core of this material will remain high at different operating temperatures downhole. Electromagnetic sensor 121 illustrated in FIGS. 1-2 may be capable of properly performing its design function at a pressure of about twenty-five kpsi and a temperature of about 150° C.

Thus, the core of each of the sectors 200 of electromagnetic sensor 121 of FIGS. 1-3 may be formed of a material having at least one of a high initial permeability and high mechanical reliability to produce a sensor of high temperature stability and high mechanical reliability. For example, a non-ferrite material or a non-ferrite ribbon material, or a nano-magnetic ribbon material, or the amorphous ribbon discussed in connection with FIG. 4 may be utilized. Indeed, the cores of electromagnetic sensor 121 may be formed from an amorphous ribbon instead of ferrite, as ferrite cores may be brittle and prone to breaking, while ribbon cores (such as amorphous ribbon cores) may be more pliable and more flexible and may not have this problem. Furthermore, using ribbon cores, instead of ferrite cores, may provide increased sensor sensitivity and greater stability of sensor sensitivity, as discussed above. For example, by using ribbon cores rather than ferrite cores, sensitivity to transient signals may improve for each of the sectors 200 and accordingly for electromagnetic sensor 121 as a whole. By using an amorphous ribbon or other nano-magnetic material, for example, sensitivity may be increased while reducing the required number of turns in each coil or winding, which may increase the bandwidth of electromagnetic sensor 121. Improved sensitivity to transient signals may lead to improvements in LWD measurements, improvements in data accuracy, and improvements in resource utilization, speed, and efficiency.

Although improvements in sensitivity and other areas may result, it is worth noting that it is possible that the nano-magnetic material (or other material having any of the aforementioned three properties) may be somewhat conductive, which may generate internal eddy currents when the nano-magnetic (or such other) material is subject to a changing external magnetic field. The eddy currents in the conductive magnetic core may cause spurious signals, which may hinder the obtaining of accurate LWD or the like measurements/data.

Figure 5:
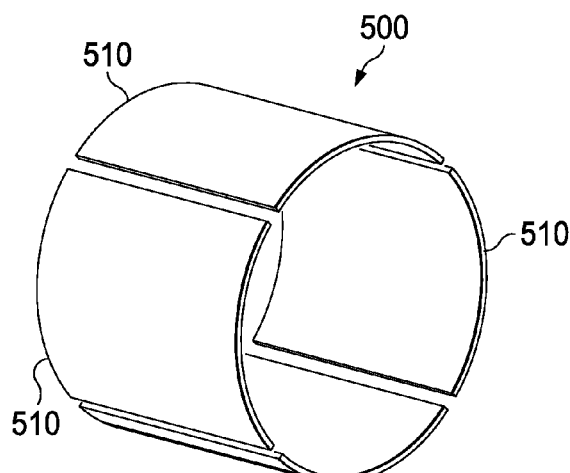
FIG. 5 illustrates a first configuration of magnetic core portions of four sectors of an electromagnetic sensor, in accordance with some embodiments.
Figure 6:
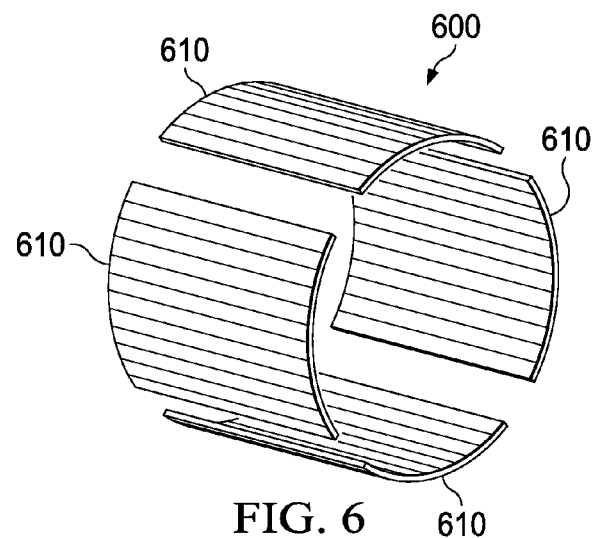
FIG. 6 illustrates a second configuration of magnetic core portions of four sectors of an electromagnetic sensor with each core being "sliced" in a first direction (e.g., parallel to a Z axis of an electromagnetic sensor), in accordance with some embodiments.
Figure 7:
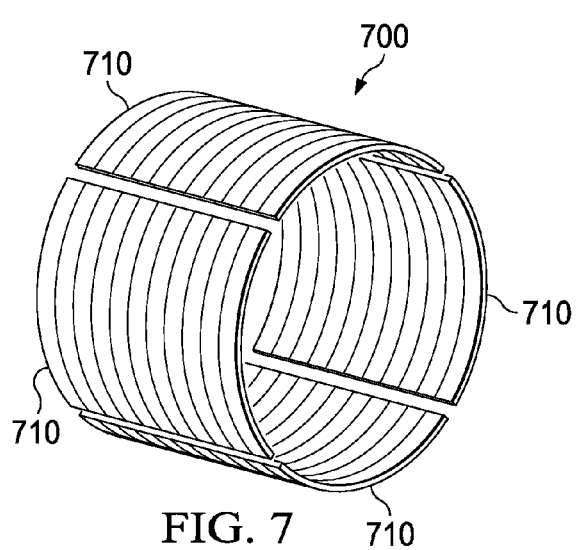
FIG. 7 illustrates a third configuration of magnetic core portions of four sectors of an electromagnetic sensor with each core being "sliced" in a second direction (e.g., perpendicular to a Z axis of an electromagnetic sensor), in accordance with some embodiments.
Figure 8:
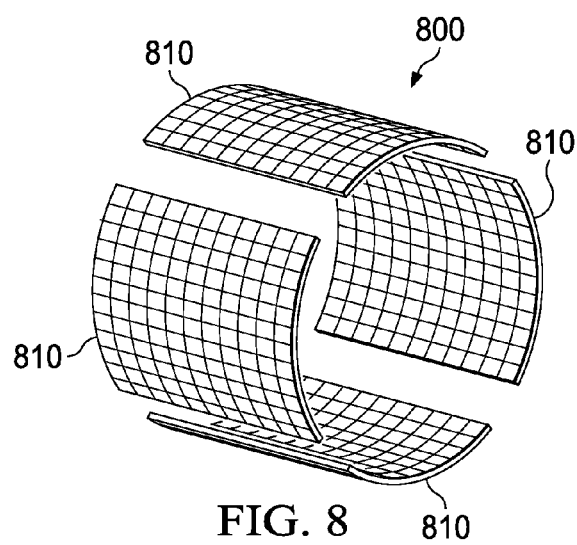
FIG. 8 illustrates a fourth configuration of magnetic core portions of four sectors of an electromagnetic sensor with each core being "sliced" in both a first and second direction, in accordance with some embodiments.

FIGS. 5-8 illustrate techniques and arrangements for reducing or eliminating such eddy current effects. Specifically, to eliminate or suppress the eddy current effects, magnetic core 210 (FIG. 2) of sector 200 (and each of the other magnetic cores of other sectors) may be divided using different cutting techniques into subsections, which may be referred to as small sections. FIGS. 6-8 illustrate various magnetic core geometries in which the magnetic cores (610, 710 and 810) have been sliced or diced into a plurality of small sections. Each of magnetic cores 510, 610, 710, and 810 represent different embodiments of previously discussed core 210. For example, each of cores 510, 610, 710 and 810 may be configured for use in a multi-sector sensor, such as sensor 121. FIG. 5 illustrates a view 500 for an embodiment of four cores 510 for use in electromagnetic sensor (e.g., sensor 121) with each core 510 for each of four sectors configured as a single piece (i.e., not divided into small sections). For example, a single cylindrical core may initially be constructed as a single piece (not shown), by layering strips of magnetic ribbon to form a cylinder of multiple layers of ribbon interleaved with epoxy tape and then cutting the cylindrical core into quadrant sections to create the four cores 510. FIG. 6 illustrates view 600 showing one embodiment of cores for use in an electromagnetic sensor (e.g., sensor 121) with each core 610 for each quadrant sector separated (e.g., sliced) lengthwise parallel to the main sensor z-axis. (The main sensor z-axis is shown in FIG. 1 but not in FIGS. 5-8; it corresponds to the axis of the cylinder formed by the quadrants of cores 610.) For example, a core may be constructed to be configured as illustrated in FIG. 6, in a manner similar to that described above for FIG. 5 but by cutting the resulting quadrant core portions 610 into axial (i.e., horizontal as illustrated in the FIG. 6) strips. FIG. 7 illustrates view 700 showing one embodiment of cores 710 for use in an electromagnetic sensor (e.g., sensor 121) with each core 710 of each quadrant sector separated in many slices oriented circumferentially about the main sensor z-axis. In another example, the core 710 of FIG. 7 may be formed by constructing a plurality of (e.g., eleven) individual short (e.g., ten mm long) cylinders with magnetic ribbon interleaved with epoxy tape, stacking the resulting short cylinders to form a long cylinder, and cutting the resultant long cylinder into quadrant sector sections to form cores 710. FIG. 8 illustrates view 800 representing an embodiment of cores 810 suitable for use in an electromagnetic sensor (e.g., 121) with each core 810 of each of quadrant sector separated (e.g., diced) in both the axial direction (as in FIG. 6) and the circumferential direction (as in FIG. 7) to form tiles. For example, core 810 may be constructed in a manner similar to the construction described for FIG. 6 or 7 but by making additional cross cuts to cut the material into squares. After the dicing, the small core sections, such as those illustrated in FIGS. 6-8, may be coupled together (e.g., using a non-conductive material such as non-conductive epoxy tape or a non-conductive epoxy functioning as a glue). This arrangement of small sections coupled together with non-conductive material may suppress the eddy currents generated in the magnetic core of each sector quadrant for each sector 200 when configured into an electromagnetic sensor (e.g., sensor 121). Moreover, the arrangements of small core sections discussed for cores 610, 710, and 810 may minimally affect the magnetic properties of electromagnetic sensor 121. Note that assembly of core sections may not be limited to the arrangements of cores 510, 610, 710, and 810. For example, combinations of these cutting techniques may be combined to produce a core for a sector or sectors created from different cutting techniques could be combined in a single sensor. Also, "tiles" of core 810 may not be placed directly on top of tiles at a different layer of core 810 and may be staggered relative to a next interior layer of magnetic ribbon material. Clearly, if tiles are staggered relative to different layers within core 810 at least a portion of cutting into small sections would take place prior to layering the magnetic ribbon material.

Returning to FIG. 1, electromagnetic sensor (MS) 121 may send data (e.g., sensed transient signals, data related to sensing of transient signals, etc.) to internal processing components (not shown) of receiver subassembly 120 The internal processing components of receiver subassembly 120 are similar in nature to internal processing components of other well logging and downhole measurement tools (and subassemblies). Internal processing components of receiver subassembly 120 may include, but not be limited to, any of the following: software, hardware, middleware, firmware, components, a processor (e.g., digital signal processor (DSP) and control), a controller, a memory, another sensor (e.g., an auxiliary or aux sensor), a bus interface, a bus, a receiver, an acquisition entity (e.g., software and hardware to handle acquired transient signals or dated related to acquired transient signals), a network, preamplifier, terminals, etc. The internal processing components may further be remote or local to receiver subassembly 120 and configured in such a way to receive and process data from electromagnetic sensor 121, such as illustrated in FIG. 1, as will be understood by one of ordinary skill in the art in view of the instant disclosure. Additionally, those of ordinary skill in the art will appreciate that this listing and arrangement of items for the internal processing components is not exhaustive and variations may be possible. For example, one variation may be that the internal processing components include some and not all of the listed items, while another variation may be that the internal processing components include a plurality of an item (e.g., a plurality of memories).

With continued reference to FIG. 1, receiver subassembly 120 may also include a bucking sensor (BS) 122. Bucking sensor 122 may be used to filter out an undesired "pipe signal" caused by signals from transmitter subassembly 140 propagating along drill pipe 110. Bucking sensor 122 is placed between transmitter subassembly 140 and electromagnetic sensor 121 to assist in identification and filtering of any pipe signal that might be registered by electromagnetic sensor 121. Bucking sensor 122 may be collocated (e.g., having coordinated axial orientation) on drill pipe 110 with electromagnetic sensor 121 and be comparable in sensor sensitivity with electromagnetic sensor 121. Bucking sensor 121 may be similar (or identical) to electromagnetic sensor 121, such as similar in structure, sensitivity, and/or function, and the discussion regarding electromagnetic sensor 121 above may be considered applicable to bucking sensor 122. For example, bucking sensor 122 may be at least one of an induction logging sensor, a single axis sensor, or a multi-axial sensor. More specifically, bucking sensor 122 may be a tri-axial transient induction (a broadband induction type) sensor for sensing of transient signals along an x-axis, a y-axis, and a z-axis (preferably collocated with the x, y, and z-axes of electromagnetic sensor 121). Furthermore, bucking sensor 122 may include a plurality of sectors, such as four quadrant sectors similar to quadrant sectors 200 of FIG. 2. Each of the four quadrant sectors of bucking sensor 122 may include a magnetic core formed of a material with a high initial magnetic permeability. Alternatively, the material forming the core may have at least one of high initial magnetic permeability and high mechanical reliability to produce a sensor (e.g., bucking sensor 122) having high temperature stability and high mechanical reliability. Any of these properties may improve sensitivity to transient signals. Each of the quadrant sectors of bucking sensor 122 may include one or more coils, for example, two coils similar to coil 220 and coil 240 of FIG. 2, and the respective coils may be wound in directions orthogonal to each other around portions of the magnetic core for sensing of the transient signals. Moreover, bucking sensor 122 may send data (e.g., sensed transient signals, data related to sensed transient signals, etc.) to the internal components of subassembly 120 as discussed above. Thus, in accordance with some embodiments of this disclosure, the receiver subassembly 120 may include two tri-axial electromagnetic sensors (e.g., electromagnetic sensor 121 and bucking sensor 122), which may be spaced apart, for example, by about ten feet. The two tri-axial electromagnetic sensors may be collocated and enclosed by at least one non-conducting sleeve (not shown).

With continued reference to FIG. 1, transmitter subassembly 140 may include a transmitter (TX) 141, current pulsers (CP) 142, and other components (O) 143. Transmitter 141 may be at least one of an induction logging transmitter, a single axis transmitter, or a multi-axial transmitter. For example, transmitter 141 may be a tri-axial transmitter that transmits along an x-axis, a y-axis, and a z-axis. Transmitter 141 may be similar to electromagnetic sensor 121, for example, each may have structural similarities. Transmitter 141 may receive data from current pulsers 142. Transmitter 141 may also send data to the internal components (not shown) of transmitter subassembly 140. The internal components of transmitter subassembly 140 may be similar to the internal components of other subassemblies and may include any of the following: software, hardware, middleware, firmware, components, a processor, a controller, a memory, another transmitter, a bus interface, a bus, one or more current pulsers 142 (e.g., current pulser for x-axis, current pulser for y-axis, and current pulser for z-axis), a dipole digitizer, a network, etc. As with other subassemblies, the internal components of transmitter subassembly may be remote or local to transmitter subassembly 140 and configured in such a way to receive and process data from transmitter subassembly 140. Additionally, those of ordinary skill in the art will appreciate that this listing and arrangement of items for the internal components is not exhaustive and variations may be possible as explained above.

In operation, logging tool 100 may use transmitter subassembly 140 to produce alternating magnetic dipoles in sequence along three transmit axes (x, y, and z). For example, transmitter subassembly 140 may produce alternating magnetic dipoles in sequence along each of these three axes in response to current generated from pulsers 142 The dipole reversals caused by transmitter subassembly 140 may produce currents in the surrounding subsurface formation. These currents diffuse outward, and their impact with the resistivity structures in the formation may be sensed by electromagnetic sensor 121 and/or bucking sensor 122 of receiver subassembly 120. As an example, the alternating magnetic dipoles may flip in a period of about six microseconds to create currents that dissipate out into the subsurface formation, and the electromagnetic sensor 121 and/or the bucking sensor 122 (and possibly even more sensors) may sense those currents as they move out. As a result, inferences as to where those currents go through bed boundaries may be made, distances to a bed may be computed, and geo-steering may be performed.

As previously noted, eddy currents may be generated in conductive materials subjected to a changing magnetic field. In the context of the instant disclosure, such eddy currents may generate spurious signals that hinder obtaining accurate measurements. With regard to the immediate discussion, in operation, the dipole reversals created by transmitter subassembly 140 may produce eddy currents in drill pipe 110 that may be sensed (as spurious signals) by electromagnetic sensor 121 and/or bucking sensor 122. A bucking algorithm may be used (e.g., using information from bucking sensor 122) to suppress these spurious pipe signals and extract the formation signals indicative of the resistivity structure of the formation. Also, electromagnetic sensor 121 and/or bucking sensor 122 may be constructed in a manner that suppresses or eliminates spurious signals induced by transient eddy currents in drill pipe 110, specifically, by dividing the magnetic cores of these sensors into small sections, as described in connection with FIGS. 5-8. Electromagnetic sensor 121 and/or bucking sensor 122 may also be constructed to allow for precise and robust matching of pairs of complete tri-axial sensors, and to allow for the use of the aforementioned bucking algorithms to suppress spurious signals from the eddy currents in drill pipe 110.

Figure 9:
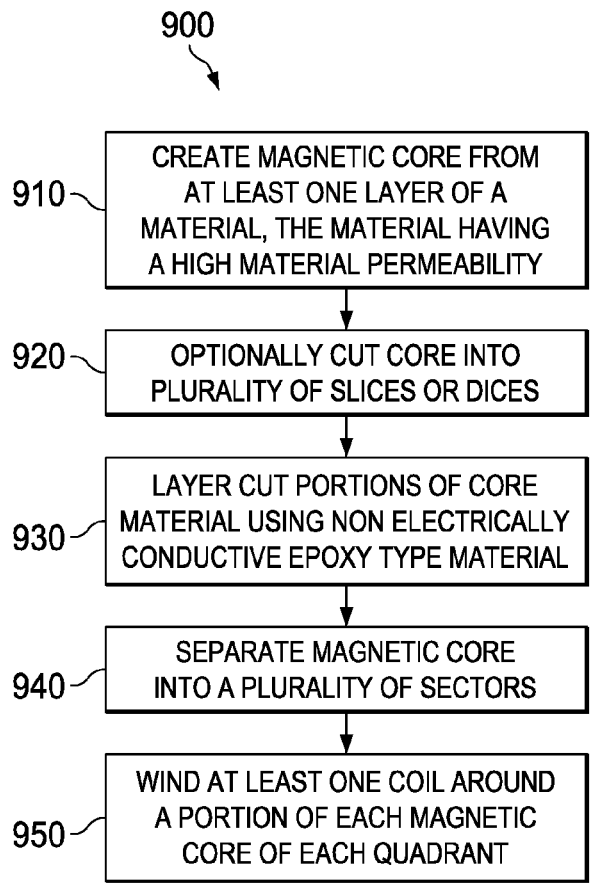
FIG. 9 illustrates a flowchart of one embodiment of a method of manufacturing an electromagnetic sensor for downhole measurements, in accordance with some embodiments.

FIG. 9 is a flowchart illustrating a method 900 of manufacturing an electromagnetic sensor (or portion thereof) for downhole measurements, such as electromagnetic sensor 121 and/or bucking sensor 122 of FIG. 1, in accordance with some embodiments. At 910, a magnetic core may be created from at least one layer of a material, the material having a high initial magnetic permeability. In accordance with some other embodiments, the material may also have high mechanical reliability to produce a sensor of high temperature stability and/or high mechanical reliability. Each of these properties may improve a sensor's ability to reliably measure transient signals. Creating the magnetic core may include coupling a plurality of layers of nano-magnetic ribbon material together with an epoxy. In accordance with some embodiments, creating the magnetic core may include coupling a plurality of layers of amorphous ribbon together with an epoxy. Also, various materials having the aforementioned properties have been discussed herein in connection with FIGS. 2-8 and any of these materials may be used in place of, or in combination with, the nano-magnetic ribbon material/amorphous ribbon. At 920, the magnetic core may be optionally separated (e.g., sliced or diced) into a plurality of strips or tiles. Separating into strips or tiles may be effective to reduce eddy currents as discussed above. At 930, the cut portions may be layered and attached to each other using an adhesive means, such as epoxy (e.g., non-conductive epoxy tape or glue). At 940, cores may be separated into a plurality of sectors as discussed above. Separating the magnetic core into the plurality of sectors may include separating the magnetic core into four quadrants (e.g., quadrant sectors as shown at least at elements 200 of FIGS. 2-3 and elements 510, 620, 710, and 810 of FIGS. 5-8, respectively). At 950, at least one coil may be wound around a portion of each magnetic core of each quadrant sector for sensing of the transient signals. For example, a plurality of coils may be wound in directions orthogonal to one another around portions of each magnetic core of each quadrant sector for sensing of the transient signals, as discussed above. Winding the plurality of coils may include winding two coils in directions orthogonal to one another (e.g., coils 220, 240 of FIG. 2).

Method 900 may include various modifications, including additional, fewer, or different steps. Furthermore, electromagnetic sensor 121 and/or bucking sensor 122 may be mechanically constructed to allow the particular sensor to be assembled and/or serviced without disassembly of logging tool 100 of FIG. 1. Method 900 may be modified to incorporate steps associated with this construction/assembly.

Figure 10:
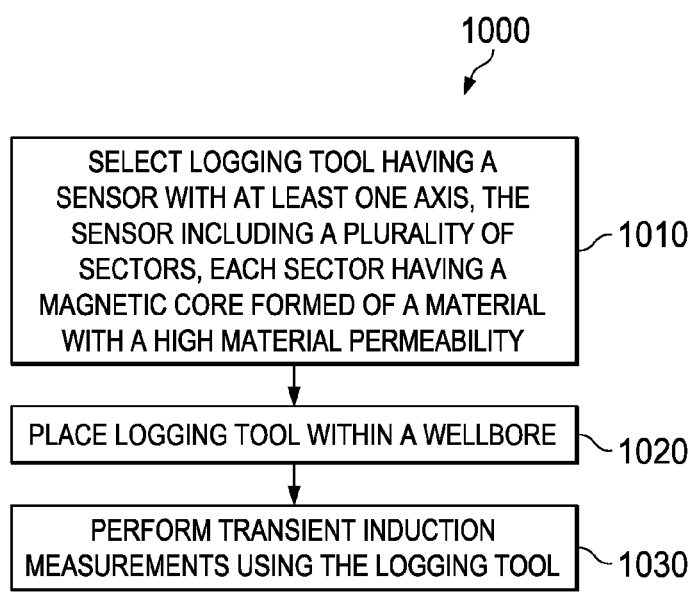
FIG. 10 illustrates a flowchart of one embodiment of a method for performing downhole transient induction measurements using an electromagnetic sensor configured in accordance with some embodiments.

FIG. 10 is a flowchart illustrating a method 1000 for performing downhole transient induction measurements, in accordance with some embodiments. At 1010, a logging tool (e.g., logging tool 100 of FIG. 1) may be provided, and the logging tool may comprise a sensor with at least one axis (e.g., electromagnetic sensor 121 and/or bucking sensor 122 of FIG. 1). The sensor may include a plurality of sectors (e.g., quadrant sectors 200 of FIGS. 2-3). Each sector may comprise a magnetic core formed of a material having a high initial magnetic permeability, which property may improve sensitivity to transient signals (see, e.g., the discussion regarding FIG. 4). In accordance with some embodiments, the material may also have high mechanical reliability to allow for a sensor of high temperature stability and/or high mechanical reliability. At 1020, the logging tool may be disposed within a wellbore. At 1030, transient induction measurements may be performed using the logging tool. Method 1000 may include various modifications, including additional, fewer, or different steps. For instance, with respect to the logging tool/sensor, each sector may include at least one coil wound around a portion of the magnetic core, which coil(s) may be used for sensing of the transient signals. For example, as described above, a plurality of coils may be wound in directions orthogonal to each other around portions of the magnetic core for sensing of transient signals (e.g., coils 220, 240 of FIG. 2).

In light of the principles and example embodiments described and illustrated herein, it will be recognized that example embodiments can be modified in arrangement and detail without departing from such principles. For example, the principles may be applicable to single axis sensors, not just to multi-axial sensors. The single axis sensor may be an induction logging sensor. For example, a single axis sensor may include at least one core formed of a material with a high initial magnetic permeability to improve sensitivity to transient signals. The material may also have a high mechanical reliability. The material may be at least one of a nano-magnetic material, a nano-magnetic ribbon material, a nano-crystalline material, an amorphous ribbon, or a non-ferrite material. The material may have a relative magnetic permeability of at least one of approximately 10,000, approximately 20,000, or in the range of approximately 10,000 to approximately 20,000. Indeed, per the principles of the present disclosure, a single axis sensor may include or use a ribbon core(s), such as an amorphous ribbon core, as described herein.

Returning to the core of the single axis sensor, the single axis sensor may include a plurality of sectors, wherein each sector comprises a magnetic core formed of a material with a high initial magnetic permeability to improve sensitivity to transient signals. Moreover, the magnetic core may be divided into a plurality of small sections, and the small sections may be coupled together by a non-conductive epoxy. For example, the single axis sensor may include a plurality of sectors similar to quadrant sectors 200 of FIGS. 2-3, but without one or both of coils 220, 240 illustrated in FIG. 2. Alternatively, the single axis sensor may be different than shown in FIGS. 2-3, but may still include at least one core that is formed of a material with a high initial magnetic permeability for improving sensitivity to transient signals.

The principles of the present embodiments may be applicable in a variety of contexts, such as, but not limited to, the context of a logging while drilling (LWD) tool, a well logging tool, a reservoir monitoring tool, a tool for use in outer space or on a non-Earth body (e.g., a tool on a moon lander), a resistivity tool, a surface geophysical measurement tool, a tool for geo-steering, a tool for environments with a lot of vibrations (e.g., a car crash monitor), or a tool for use through a casing (e.g., by using switchable magnets to magnetize a pipe and then use the magnetized pipe to induce fields). Furthermore, although electromagnetic sensor 121 may be discussed herein in terms of transient signals, the principles of the present embodiments may be applicable to other contexts and may not involve transient signals. For example, the principles of the present embodiments may be applicable to sensors for continuous wave induction tools. Indeed, electromagnetic sensor 121 can just as readily be used for continuous wave induction tools, which use single or multiple frequency continuous sine waves for measuring formation resistivity. For example, a magnetic core of a sensor for continuous wave induction tools may be formed of a ribbon material with a high initial magnetic permeability, and therefore, the magnetic core of the sensor for continuous wave induction tools may be more pliable and flexible and not as brittle, as discussed hereinabove, as a core formed of ferrite. Furthermore, as discussed hereinabove, the material forming the magnetic core of the sensor for continuous wave induction tools may also provide for a sensor possessing a high temperature stability and/or a high mechanical reliability. The material may be at least one of a nano-magnetic material, a nano-magnetic ribbon material, a nano-crystalline material, an amorphous ribbon, or a non-ferrite material. The material may have a relative magnetic permeability of at least one of approximately 10,000, approximately 20,000, or in the range of approximately 10,000 to approximately 20,000. Indeed, per the principles of the present disclosure, the sensor for continuous wave induction tools may include or use a ribbon core(s), such as an amorphous ribbon core, as described herein. Using the ribbon core(s) may also provide increased sensitivity and greater stability of sensitivity.

Also, the foregoing discussion has focused on particular embodiments, but other configurations are also contemplated. In particular, even though expressions such as "in one embodiment," "in another embodiment," or the like are used herein, these phrases are meant to generally reference embodiment possibilities, and are not intended to limit this disclosure to particular embodiment configurations. As used herein, these terms may reference the same or different embodiments that are combinable into other embodiments. As a rule, any embodiment referenced herein is freely combinable with any one or more of the other embodiments referenced herein, and any number of features of different embodiments are combinable with one another, unless indicated otherwise.

Similarly, although example processes have been described with regard to particular operations performed in a particular sequence, numerous modifications could be applied to those processes to derive numerous alternative embodiments of the present disclosure. For example, alternative embodiments may include processes that use fewer than all of the disclosed operations, processes that use additional operations, and processes in which the individual operations disclosed herein are combined, subdivided, rearranged, or otherwise altered.

This disclosure may include descriptions of various benefits and advantages that may be provided by various embodiments. One, some, all, or different benefits or advantages may be provided by different embodiments.

In view of the wide variety of useful permutations that may be readily derived from the example embodiments described herein, this detailed description is intended to be illustrative only, and should not be taken as limiting the scope of this disclosure. What is claimed as the invention, therefore, are all implementations that come within the scope of the following claims, and all equivalents to such implementations.

What is claimed is:

1. An apparatus, comprising:
an electromagnetic sensor comprising a plurality of sectors,
wherein the plurality of sectors comprises a plurality of circumferentially extended sectors collectively configured in a substantially cylindrical shape with a separating gap between adjacent ones of the plurality of sectors, the separating gap separating the adjacent ones of the plurality of sectors in a circumferential direction,
wherein each of the plurality of sectors comprises a magnetic core formed of a material having a high initial magnetic permeability, the material comprising at least one of a nano-magnetic material, a nano-magnetic ribbon material, a nano-crystalline material, an amorphous ribbon, or a non-ferrite material, and
wherein at least one of the plurality of sectors comprises (a) two coils disposed on respective portions of the magnetic core thereof, and (b) a shield disposed between respective portions of the two coils, the respective portions of the two coils both facing a region radially exterior of the respective sector.

2. The apparatus of claim 1, wherein the electromagnetic sensor has at least one of the following properties: a high temperature stability and a high mechanical reliability.

3. The apparatus of claim 1, wherein the electromagnetic sensor comprises an induction logging sensor, a single axis sensor, or a multi-axial sensor.

4. The apparatus of claim 1, wherein the two coils are wound, in respective directions orthogonal to one another, around the respective portions of the magnetic core of the respective sector.

5. The apparatus of claim 1, wherein, for each sector, the material forming the magnetic core thereof has a relative magnetic permeability in a range of 10,000 to 20,000.

6. The apparatus of claim 1, wherein the plurality of sectors is selected from the group consisting of: two semicircles, four quadrants, six sextants, eight octants, a plurality of sectors of equal sizes, and a plurality of sectors including at least two sectors of unequal size.

7. The apparatus of claim 1, wherein, for each of the plurality of sectors, the magnetic core comprises a plurality of subsections coupled together by a non-conductive material.

8. A method of manufacturing an electromagnetic sensor, comprising:
creating a plurality of sectors, (i) wherein the plurality of sectors comprises a plurality of circumferentially extended sectors collectively configured in a substantially cylindrical shape with a separating gap between adjacent ones of the plurality of sectors, the separating gap separating the adjacent ones of the plurality of sectors in a circumferential direction, and (ii) wherein each of the plurality of sectors comprises a magnetic core formed from at least one layer of a material having a high initial magnetic permeability, the material comprising at least one of a nano-magnetic material, a nano-magnetic ribbon material, a nano-crystalline material, an amorphous ribbon, or a non-ferrite material; and
disposing (a) two coils on respective portions of the magnetic core of at least one of the plurality of sectors, and (b) a shield between respective portions of the two coils, the respective portions of the two coils both facing a region radially exterior of the respective sector.

9. The method of claim 8, wherein the electromagnetic sensor has at least one of the following properties: a high temperature stability and a high mechanical reliability.

10. The method of claim 8, wherein the disposing of the two coils on respective portions of the magnetic core of at least one of the plurality of sectors comprises winding the two coils, in respective directions orthogonal to one another, around the respective portions of the magnetic core of the respective sector.

11. The method of claim 8, further comprising creating each magnetic core by adhering a plurality of layers of the nano-magnetic ribbon material together with a non-conductive epoxy.

12. The method of claim 8, further comprising, for each of the plurality of sectors, dividing the magnetic core into a plurality of subsections and coupling the subsections together with a nonconductive material.

13. The method of claim 8, wherein the plurality of sectors is selected from the group consisting of: two semicircles, four quadrants, six sextants, eight octants, a plurality of sectors of equal sizes, and a plurality of sectors including at least two sectors of unequal size.

14. A method, comprising:
providing a logging tool comprising a sensor, the sensor comprising a plurality of sectors, (i) wherein the plurality of sectors comprises a plurality of circumferentially extended sectors collectively configured in a substantially cylindrical shape with a separating gap between adjacent ones of the plurality of sectors, the separating gap separating the adjacent ones of the plurality of sectors in a circumferential direction, (ii) wherein each of the plurality of sectors comprises a magnetic core formed of a material having a high initial magnetic permeability, the material comprising at least one of a nano-magnetic material, a nano-magnetic ribbon material, a nano-crystalline material, an amorphous ribbon, or a non-ferrite material, and (iii) wherein at least one of the plurality of sectors comprises (a) two coils disposed on respective portions of the magnetic core thereof, and (b) a shield disposed between respective portions of the two coils, the respective portions of the two coils both facing a region radially exterior of the respective sector;

disposing the logging tool within a wellbore; and performing a transient induction measurement using the logging tool.

15. The method of claim 14, wherein the sensor has at least one of the following properties: a high temperature stability and a high mechanical reliability.

16. The method of claim 14, wherein the two coils are wound, in respective directions orthogonal to one another, around the respective portions of the magnetic core of the respective sector.

17. The method of claim 14, wherein, for each of the plurality of sectors, the magnetic core thereof comprises a plurality of subsections coupled together by a non-conductive material.

18. The method of claim 14, wherein, for each of the plurality of sectors, the magnetic core thereof comprises a plurality of layers of the nano-magnetic ribbon material adhered together with a non-conductive epoxy.

* * * * *